United States Patent [19]

Smith

[11] 3,886,526
[45] May 27, 1975

[54] SEISMIC TRACE ANNOTATION GENERATOR

[75] Inventor: Clarence G. Smith, Irving, Tex.

[73] Assignee: Mobil Oil Corporation, New York, N.Y.

[22] Filed: Nov. 14, 1973

[21] Appl. No.: 415,925

[52] U.S. Cl. ... 340/172.5; 340/15.5 DS; 340/324 A; 346/23; 346/33 C; 346/110 R
[51] Int. Cl. ............................................. G01d 1/00
[58] Field of Search ..... 340/324 R, 324 A, 324 AD, 340/172.5, 15.5 DS, 15.5 DP; 178/6.6 R, 6.6 DD, 6.7 R; 346/23, 33 C, 110, 74 CR, 107 SC, 110 R

[56] References Cited
UNITED STATES PATENTS

| | | | |
|---|---|---|---|
| 3,426,344 | 2/1969 | Clark | 340/324 A |
| 3,626,459 | 12/1971 | Haflinger et al. | 178/6.7 R |
| 3,643,251 | 2/1972 | Kolb et al. | 178/6.7 R |
| 3,714,663 | 1/1973 | Smith | 346/23 |
| 3,786,476 | 1/1974 | Graves et al. | 340/324 A |

Primary Examiner—Gareth D. Shaw
Assistant Examiner—Leo H. Boudreau
Attorney, Agent, or Firm—C. A. Huggett; George W. Hager, Jr.

[57] ABSTRACT

Multiplexed seismic data representing a plurality of seismic channels intensity modulates each sweep of the electron beam of a cathode-ray tube. Each successive sweep of the electron beam is photographically reproduced on a rotating drum plotter to provide a plurality of seismic traces. Alpha-numeric characters, which annotate the seismic traces being recorded, are stored in digital bit matrix form. A generator produces clock pulses for multiplexing the bit information out of storage to modulate the electron beam of the cathode-ray tube and thereby cause a line of alpha-numeric characters to be photographically reproduced on the rotating drum plotter. One counter counts the clock pulses and provides the necessary control for spacing between the reproduced characters. Another counter counts the sweeps of the electron beam and provides the necessary control for both the height of the reproduced characters and the spacing between lines of the reproduced characters.

5 Claims, 17 Drawing Figures

FIG. 1

SECTION TYPE   24 FOLD STACK
AREA          OFFSHORE CALIFORNIA
SHOTPOINT         64-66
DIRECTION         NORTH
LINE NO.          6-50-73
CREW              128
DATE              3-15-73
TOTAL TRACES      24
SAMPLE RATE       4 ms.
RECORD LENGTH     5.5 sec.

FIG. 15
CHARACTER HEIGHT SELECTOR

FIG. 14
SWEEP COUNTER

SEISMIC TRACE ANNOTATION GENERATOR

BACKGROUND OF THE INVENTION

Seismic data representing a plurality of seismic channels is conventionally stored on magnetic tape for further data processing. In one such data processing operation, the information stored on the magnetic tape is used to modulate a cathode-ray tube so as to display the information on the face of the cathode-ray tube. Such display can then be photographically reproduced by means of a conventional drum plotter. The photographic reproduction obtained is a series of traces, one such trace for each seismic channel, recorded in a parallel relationship. Such a data processing operation may be carried out by means of a system such as disclosed in U.S. Pat. Nos. 3,704,450 and 3,714,663, both to Clarence G. Smith. In such a system, the seismic data stored on magnetic tape is converted to seismic analog signals. These analog signals are then multiplexed so as to provide intensity-modulation pulses for application to the electron beam of a cathode-ray tube as it sweeps across the face of the display. One intensity-modulation pulse is provided during each sweep of the electron beam for each of the seismic channels. Rotation of the drum plotter past the face of the cathode-ray tube results in each sweep of the electron beam being recorded on the drum plotter in a position displaced from the previous sweep, resulting therefore in a series of seismic trace recordings on the photographic material surrounding the drum plotter.

SUMMARY OF THE INVENTION

The present invention is directed toward a method and apparatus by which seismic traces displayed on the face of a cathode-ray tube and photographically reproduced may be annotated with alpha-numeric characters. In this aspect, a line of alpha-numeric characters are stored in digital bit character matrices. A plurality of different frequency clock pulses are produced. One of these clock pulses is selected to multiplex the bit information out of storage sequentially across common rows of each matrix. This bit information modulates the electron beam of the cathode-ray tube to cause it to display on the face of the cathode-ray tube that portion of each character in a line of characters represented by the multiplexed bit information. The frequency of the selected clock pulses determines the rate of modulation of the electron beam and, consequently, the width of each character written on the face of the cathode-ray tube. The selected clock pulses are counted and the multiplexing of the bit information out of storage is inhibited for a predetermined number of clock pulses after the last bit of each character matrix in a common row has been multiplexed to the modulation input of the cathode-ray tube, thereby providing for a spacing between each character in the line of characters as they are reproduced on the photographic recording.

In a further aspect, the modulation of the electron beam in displaying each character matrix row of bit information is repeated for a predetermined number of sweeps of the electron beam. In this manner, the height of the character reproduced on the photographic recording is proportional to the predetermined number of sweeps.

In a still further aspect, the electron beam is unmodulated for a selected number of sweeps following the completion of the reproduction of a line of characters. The number of sweeps selected determines the spacing between the recorded line of characters and the next succeeding line of characters to be recorded.

DESCRIPTION OF THE PREFERRED EMBODIMENT

Figure 1:
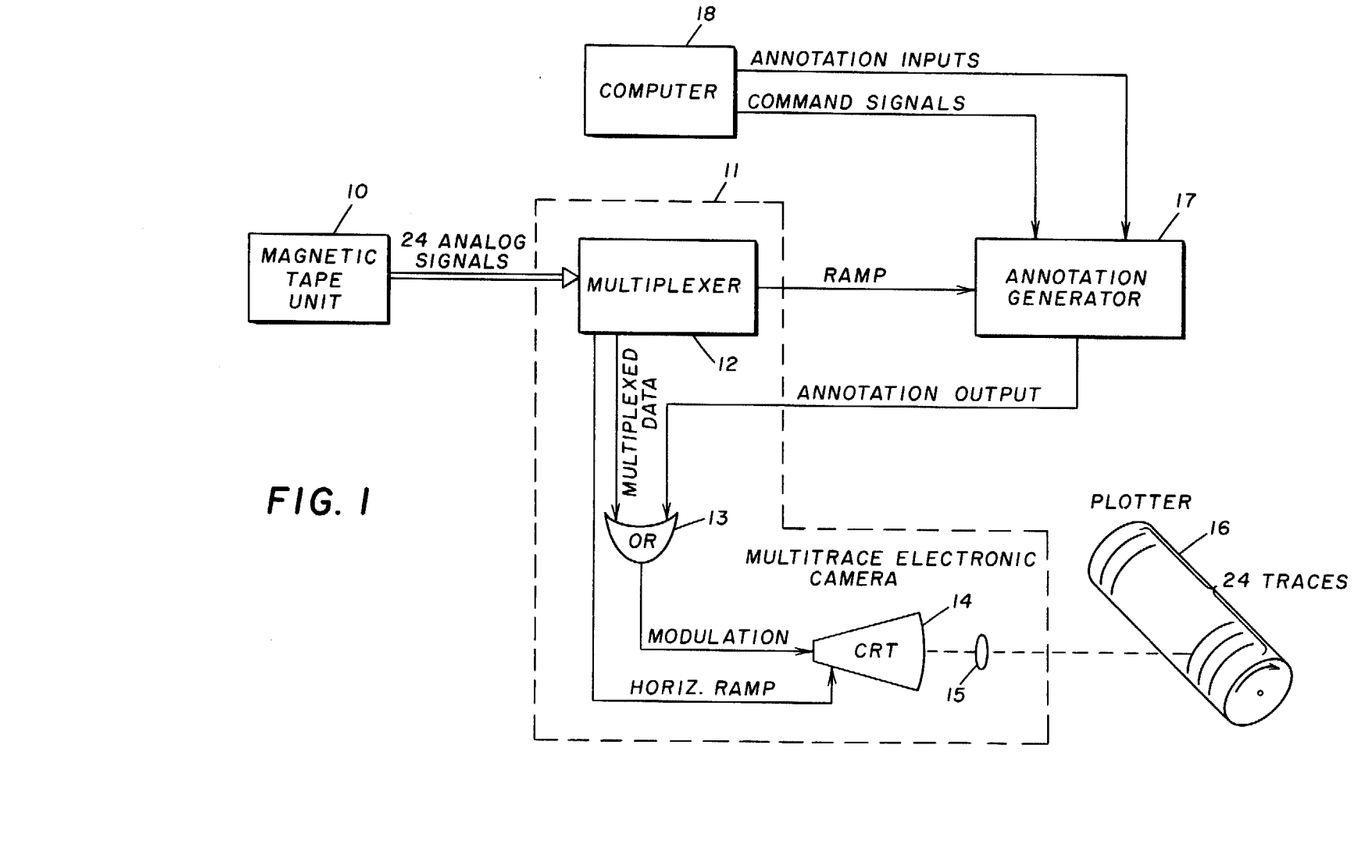
FIG. 1 is a block diagram schematic of one embodiment of the present invention.

Referring to FIG. 1, there is shown in block diagram one system embodying the present invention. A magnetic tape unit 10 converts seismic data representing, for example, 24 seismic channels to 24 seismic analog signals. These seismic analog signals are applied to a multitrace electronic camera 11. Multitrace electronic camera 11 comprises a multiplexer 12, an OR gate 13, a cathode-ray tube 14, and a lens 15. The multiplexer accepts and converts the 24 channels of seismic analog signals to multiplexed seismic data. The multiplexed data is then applied by way of OR gate 13 to cathode-ray tube 14 for intensity modulation of the electron beam. Multiplexer 12 also supplies to the cathode-ray tube a horizontal ramp signal for controlling the sweep of the electron beam across the face of the cathode-ray tube. The multiplexed data successively intensity modulates the electron beam one time during each sweep of the electron beam across the face of the cathode-ray tube for each of the 24 seismic channels. The display on the face of the cathode-ray tube is focused by lens 15 onto a plotter 16. Plotter 16 comprises a rotatable drum around which is placed a photosensitive film or paper on which is recorded the display presented on the face of cathode-ray tube 14. Each successive sweep of the electron beam on the face of the cathode-ray tube is photographically reproduced on plotter 16 in a side-by-side relationship.

A magnetic tape unit suitable for use with the foregoing described system is the TIDAR, a digital analog recorder manufactured by Texas Instruments Incorporated, Dallas, Texas. The TIDAR system stores magnetic tape input data in a buffer memory. The buffer memory transfers words under clock control to a digit register for conversion to analog signals. The analog signals are applied to a multitrace electronic camera 11. The memory buffer controls the net data rate from the magnetic tape to prevent the overflow or emptying of the memory until the transfer of analog signals to the multitrace electronic camera 11 is complete. This ensures that the cathode-ray tube display will be at a continuous and uniform data rate from beginning to end of the data transfer from the 24 seismic channels.

A multitrace electronic camera suitable for use in the system described herein is the Model MEC-630-A manufactured by Geospace Corporation of Houston, Texas. Such multitrace electronic camera comprises a multiplexer 12 which contains 24 seismic signal multiplexers, one for each seismic channel. The multiplexers convert the seismic analog signals to pulse width modulation signals suitable for cathode-ray tube presentation. These modulation signals intensity modulate the electron beam as it sweeps across the face of cathode-ray tube 14. A linear sweep or horizontal ramp signal of 250 microseconds' duration is generated and applied to the cathode-ray tube to control the sweep of the electron beam across the face of the display. The horizontal ramp signal also gates the 24 multiplexers ON and OFF once for each sweep of the electron beam or every 250 microseconds. The 24 multiplex outputs are applied by gate 13 to cathode-ray tube 14.

A plotter suitable for use with the system described herein is the PL-600 Series Cross-Section Plotter manufactured by Dresser SIE, Inc., Houston, Texas. The PL-600 Cross-Section Plotter produces a 5.5-second photographic record at the rate of 7.5 inches per second. The multitrace electronic camera 11 exposes only a small portion of the total plotter width in a given 24-seismic-trace plot. In order to plot additional 24-seismic-trace recordings adjacent to previous recordings, the camera is mounted on a movable assembly which may be automatically stepped laterally to the next 24-seismic-trace recording position.

Figure 2:
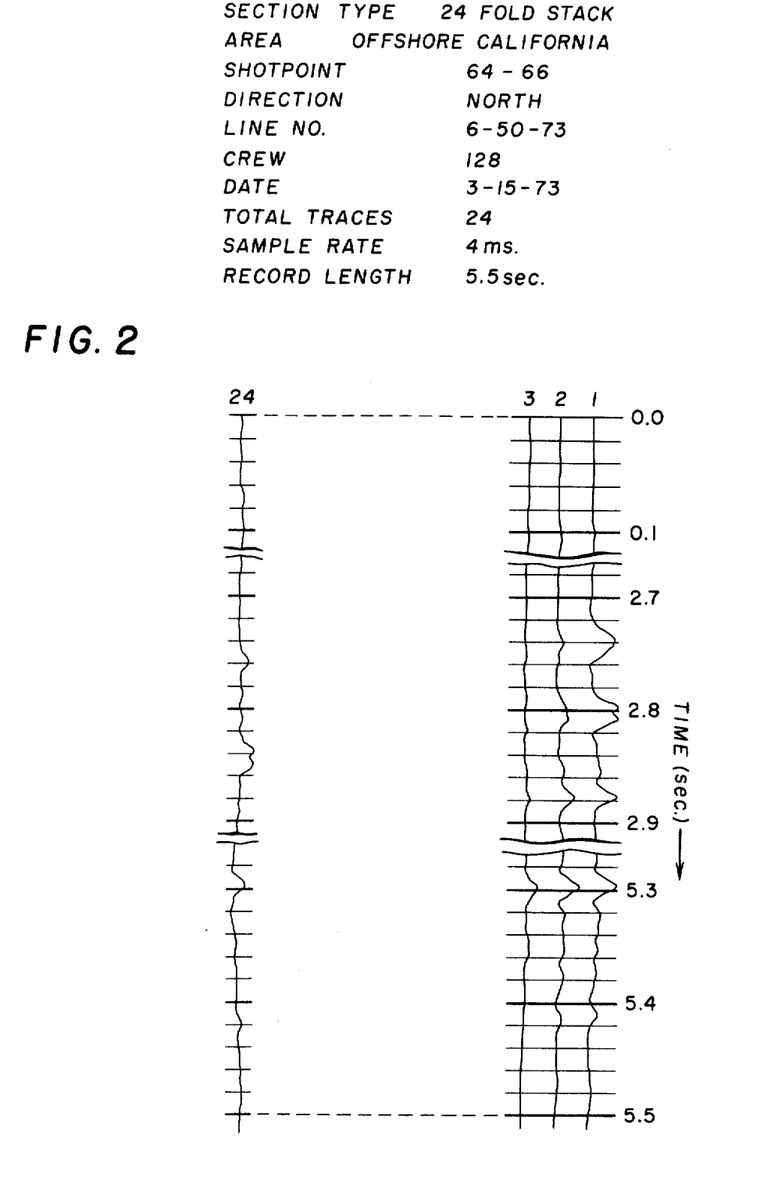
FIG. 2 illustrates 24 seismic traces which have been reproduced and annotated with alpha-numeric character information by the embodiment of the present invention.

As a specific feature of the present invention there is provided an annotation generator 17 which controls the plotting at a desired location around the drum of alpha-numeric data. This data may be used to annotate the seismic data to be plotted. A computer 18 supplies the annotation data to be plotted to the annotation generator along with various command signals for controlling the actual plotting of the annotation data. One such computer which is suitable for use with the present invention is the Model 980A supplied by Texas Instruments Incorporated of Dallas, Texas. The 980A computer supplies 64 ASC II characters of data and various commands by way of two input/output data modules, one module handling the data and the other module handling the commands. The annotation generator under control of the computer will in turn control the plotting of 32 characters per line on the plotter 21 with different size and space selections. Multiplexer 12 provides a ramp pulse at the start of each horizontal ramp signal to the cathode-ray tube 14. This ramp pulse is applied to the annotation generator 17 to initiate transfer of the annotation data by way of OR gate 13 to the cathode-ray tube 14. As the annotation data is then displayed on the face of the cathode-ray tube by successive sweeps of the electron beam, it is photographically reproduced on plotter 16. FIG. 2 represents the reproduction of, for example, 24 seismic traces on a 5.5-second photographic record with its accompanying annotation data such as section type, area, shot point, etc.

Figure 3:
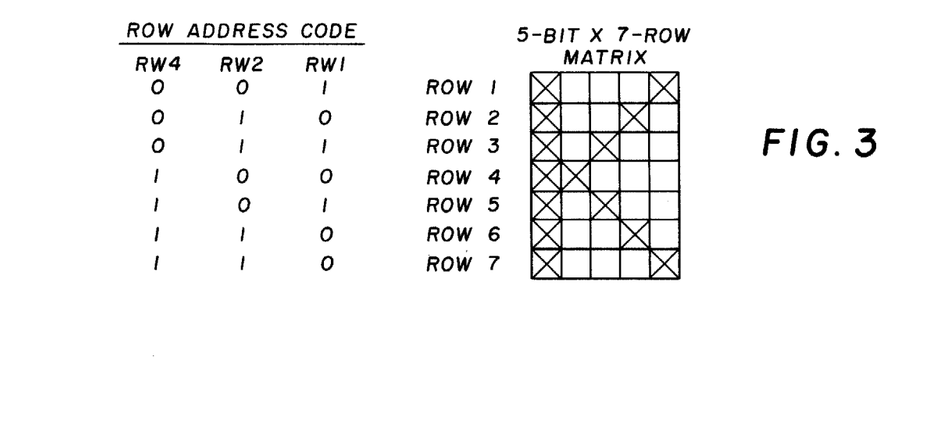
FIG. 3 depicts a typical alpha-numeric character as it might be written in 5-bit by 7-row matrix form.

The annotation generator 17 provides an annotation output of alpha-numeric characters, each in digital form of a 5-bit × 7-row matrix as illustrated in FIG. 3 for the character K, for example. In order, however, to write a line of characters across the face of the CRT 14, the 5 bits of the first row of each character matrix to be recorded in a line are sequentially multiplexed onto the annotation output to be used to modulate the electron beam during its sweep across the face of the CRT. Then, the 5 bits of the second row of each character are sequentially multiplexed onto the annotation output line, and so on through each of the seven rows to complete the 5-bit × 7-row matrix for each character in a line of characters. The timing of the annotation generator 17 is synchronized with the ramp signal from the CRT 14 so that the 5 bits of each character occur within a specified time frame along each sweep of the electron beam across the face of the CRT 14.

Figure 4:
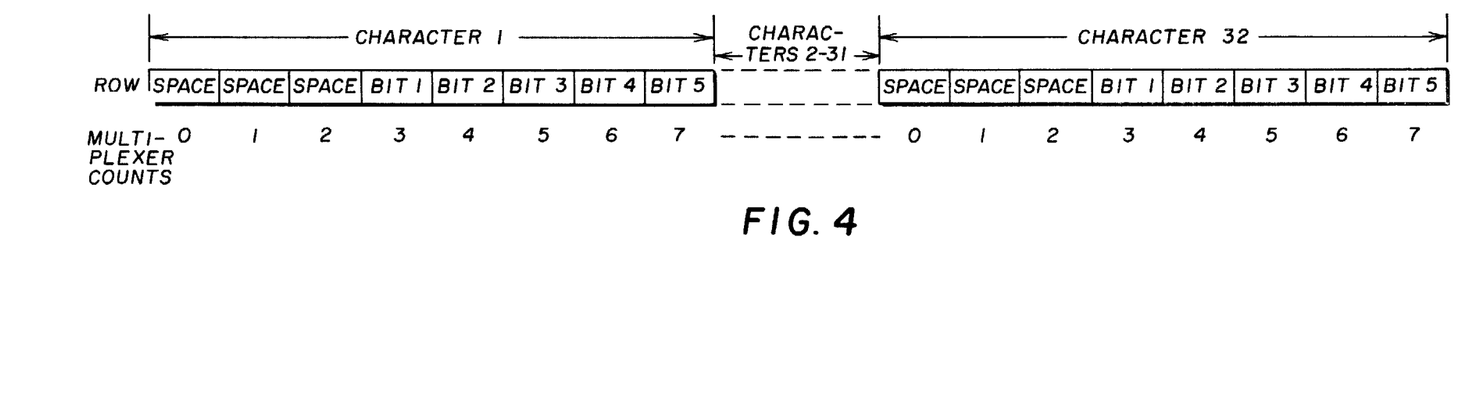
FIG. 4 depicts the sequence of multiplexing the character bit information so as to annotate the seismic traces of FIG. 2 with a line of characters written in the matrix form of FIG. 3.

Illustrated in FIG. 4 is an example of a single row of multiplexed data bits as they might appear at the annotation output of the annotation generator 17 for a line of 32 characters, for example. It will be noted that between each 5 bits of character data there are three "space" bits which are utilized to separate the characters one from another. When a bit of data on the annotation output is a logic "1", the electron beam is modulated to display a bright spot at that point along its sweep across the face of the cathode-ray tube. In the preferred embodiment of the present invention, the rotation of the drum plotter 16 provides the vertical sweep for recording each of the seven character matrix rows of the line of characters. For a drum speed of 7-½ inches/second and an electron beam sweep rate of 4 KHZ (4 sweeps/millisecond), the photographic film on the plotter moves past the face of the cathode-ray tube at a rate of approximately 0.0018 inch/sweep. A desirable height for a recorded character is, for example, about 0.1 inch. Therefore, by recording each of the seven rows of the character matrices for eight consecutive electron beam sweeps (56 total sweeps), a character height of about 0.1 inch will be achieved. It can be appreciated that other drum speeds may be used, in which case the number of electron beam sweeps per character matrix row would have to be changed accordingly in order to achieve whatever character height is desired.

After each common row of the character matrices has been recorded for a line of characters, the memory is incremented by means of a row address code signal to the next succeeding common row until all rows of the character matrices have been recorded, thereby completing the recording of an entire line of characters.

Figure 5:
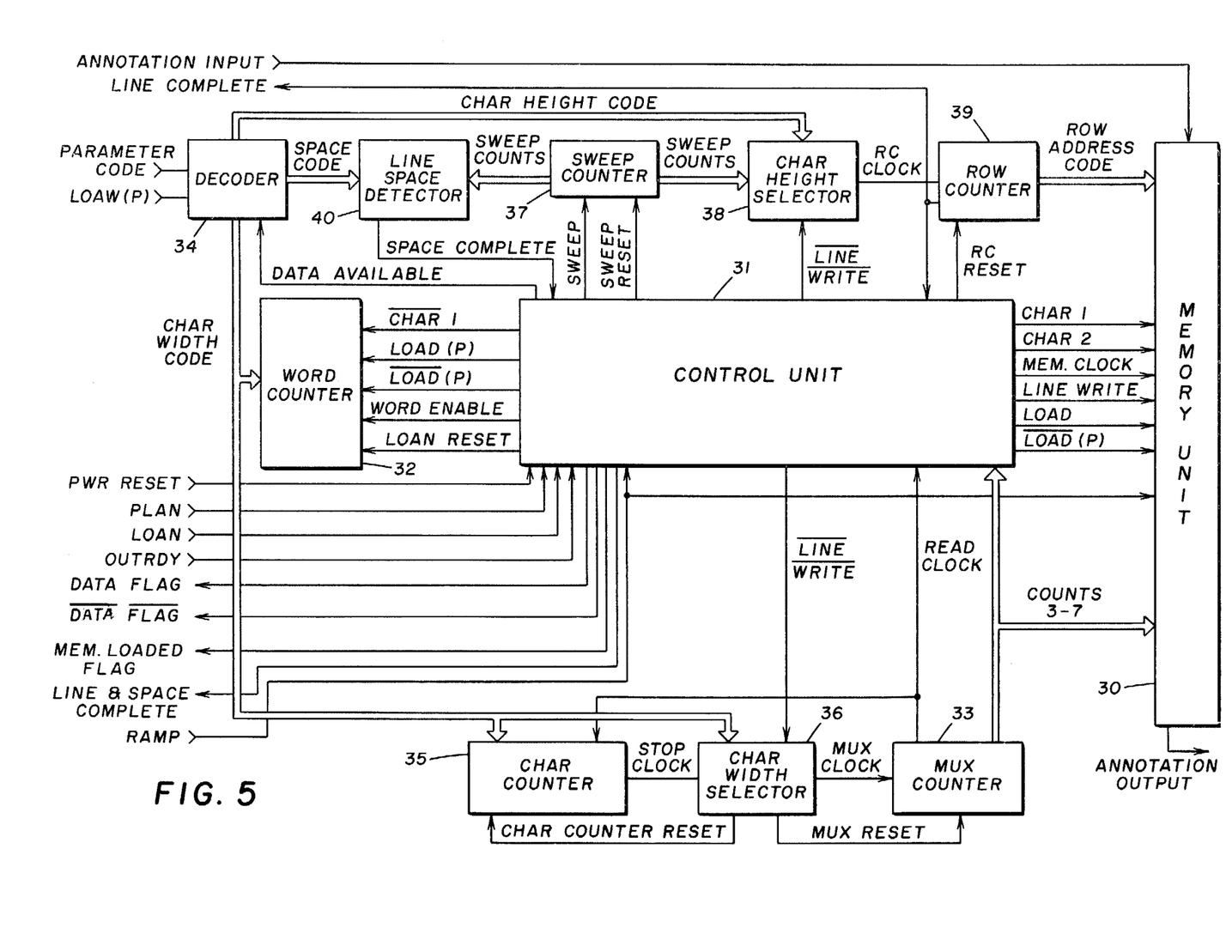
FIG. 5 is a block diagram schematic of a portion of FIG. 1.
Figure 6:
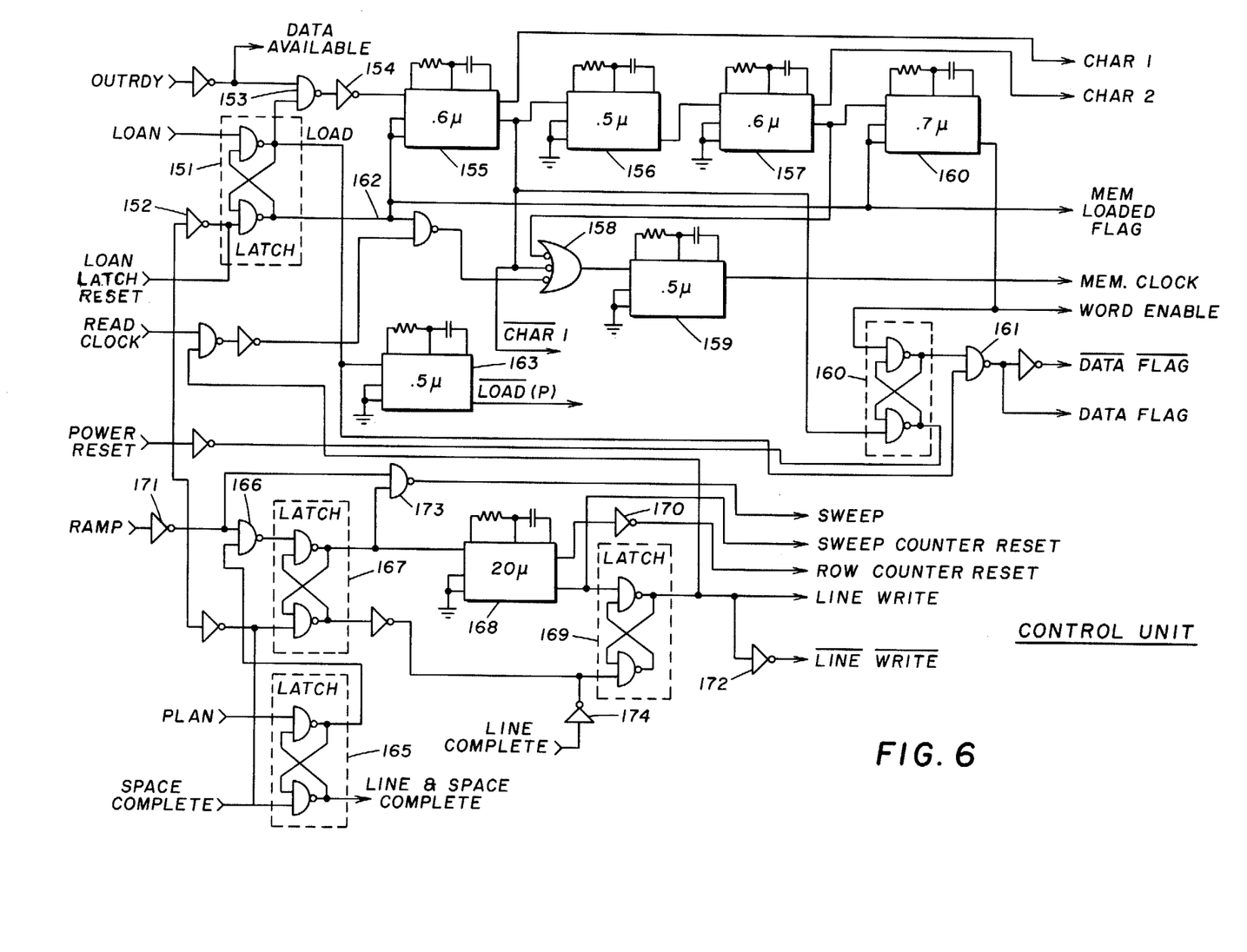
FIGS. 6–17 are circuit schematics of FIG. 5.

Referring now to FIG. 5 there is illustrated in block diagram the annotation generator 17. To initially transfer data from the computer into the memory 30, the computer first issues a load annotation data command, loan. The loan command instructs the control unit 31 that 32 characters of 6-bit data, for example, are available for loading into the memory 30. An output ready command, outrdy, is next issued and causes control unit 31 to produce the char 1 and $\overline{\text{char 1}}$ control signals. The char 1 control signal clocks the first 6-bit character of data into the first storage position of the memory unit 30 and the $\overline{\text{char 1}}$ control signal clocks the word counter 32 to advance one count. Following a fixed time delay, the control unit 31 produces the char 2 control signal which clocks the next 6-bit character of data into the next storage position of the memory unit 30. Each data word comprises two 6-bit characters. Therefore, the first data word is now loaded into the memory unit 30; and, in response, the control unit 31 produces the data flag signal which so instructs the computer to issue the next data word, and the sequence of loading 6-bit characters into the memory unit is again repeated. This sequence is recycled continuously until the word counter 32 reaches the count of 16, indicating that 16 words of 32 characters of data are loaded into memory and the memory is now full. The word counter 32 now issues a loan latch reset signal which causes control unit 31 to prevent further loading of annotation data into the memory unit.

The memory unit 30 now outputs a 5 × 7 matrix for each of the 32 characters in response to a plot annotation command, plan, from the computer. The plan command is synchronized in the control unit 31 with the ramp signal from the multitrace electronic camera, the ramp signal being produced at the beginning of each sweep of the electron beam across the face of the CRT 14. All the information required to write the first row of each of the 5-bit characters onto the face of the CRT 14 is time multiplexed onto the annotation output line of the memory unit in response to the count outputs 3–7 of the multiplexer counter 33. These count outputs correspond to the five bit positions illustrated in FIG. 4 and, as already noted, count outputs 0, 1, and 2 are not utilized by the memory 30 since three spaces separate each of the characters.

One of the features of the present invention is the control of the size of the characters to be displayed on the face of the cathode-ray tube and the vertical spacing between the characters. Prior to issuing the loan command to load the annotation data, a load annotation word parameter command, loaw(P), is issued. This loaw(P) command sets the decoder 34 to receive a 16-bit parameter input, the code of which defines the size of the characters to be displayed on the face of the CRT and the vertical spacing between the lines of characters. The decoder provides three sets of coded outputs. The first is a 4-bit character width address code AW1, AW2, AW4, and AW8. The second is a 4-bit character height address code AH1, AH2, AH4, and AH8. The third is a 4-bit line space address code AS1, AS2, AS4, and AS8.

Character width control is accomplished by controlling the multiplexer clock to the multiplexer counter 33. It is the frequency of this clock which directly controls the multiplexing of the bits of annotation data to the CRT 14. This control is carried out by applying the character width address code AW1, AW2, and AW4 to the character counter 35 and the character width selector 36. The character width selector 36 generates internally a plurality of different frequency clock pulses, one of which is selected in accordance with the character width address code, to be applied as the multiplexer clock to the multiplexer counter 33. With 3 bits of the character width address code, AW1, AW2, and AW4, any one of eight possible clock pulses may be selected as the multiplexer clock. As the frequency of the selected multiplexer clock is increased, the time interval between the counts 3–7 from the multiplexer counter 33 to the memory unit 30 is decreased and consequently the annotation data bits are multiplexed onto the annotation output line at a higher rate to decrease the width of the character displayed during each sweep of the electron beam. Conversely, if a lower frequency is selected for the multiplexer clock, the character width on the cathode-ray tube is increased.

In addition to producing the count 3–7 pulses, the multiplexer counter 33 also produces a read clock pulse following each count 7 pulse which indicates that a row of bits for one character has been written. Each read clock pulse is counted by the character counter 35 which generates a stop clock pulse after a selected number of characters have been written. In accordance with the disclosed embodiment, the number of characters per line to be written is selected in accordance with three bits of the character width address code, AW1, AW2, and AW4 from the decoder 34. This code provides for a selection of 3, 4, 6, 8, 12, 16, 24, or 32 characters per line. Upon the generation of the stop clock pulse, the multiplexer clock is inhibited and consequently further multiplexing of annotation data is prevented.

Character height control is accomplished by controlling the number of sweeps of the electron beam during which a single row of the 5-bit × 7-row matrix of annotation data is continuously multiplexed onto the face of the cathode-ray tube. This control is carried out by the sweep counter 37, the character height selector 38, and the row counter 39. The control unit 31 produces a sweep pulse for each sweep of the electron beam across the face of the CRT 14. The sweep counter 37 counts these sweep pulses and produces a plurality of selected sweep counts from S1 through S4096. Sixteen of these sweep counts, from S1 through S192, are applied to the character height selector 38. The character height address code AH1, AH2, AH4, and AH8 is also applied to the character height selector 38. With a 4-bit character height address code such as AH1, AH2, AH4, and AH8, any one of the 16 numbers of sweep counts from S1 through S192 may be selected for the character height. When the number of sweeps counted reaches the number of sweeps defined by the character height address code for the continuous multiplexing of a single matrix row of annotation data, the character height selector produces an R/C clock pulse.

Each R/C clock pulse updates the row counter 39 by one count. The count output of the row counter 39 is a row address code RW1, RW2, and RW4. The memory unit 30 responds to this row address code to increment the multiplexing of the annotation data by one row each time the code is updated by an R/C clock pulse. An example of a row address code which might be used with a 5-bit × 7-row matrix has been illustrated in FIG. 4. At the completion of all the sweeps of the electron beam required for writing the last matrix row of annotation data for a line of characters, the row counter produces a line complete signal which is applied to both the computer and the control unit 31 to terminate the multiplexing of annotation data to the CRT 14.

Control of the vertical spacing between the lines of characters is carried out by the line space selector 40. Even after the multiplexing of annotation data to the cathode-ray tube has been terminated, the character height selector 37 continues to count sweep pulses. Sixteen selected count outputs from S24 through S4096 are applied to line space detector 40. Also applied to line space detector 40 is the line space address code AS1, AS2, AS4, and AS8 from the decoder 34. With a 4-bit line space address code such as AS1, AS2, AS4, and AS8, any one of the 16 numbers of sweep counts from S24 through S4096 may be selected for character line spacing. When the number of sweeps counted reaches the number of sweeps defined by the line space address code, the line space detector 34 produces a space complete pulse which is applied to the control unit 31. In response to the space complete pulse, the control produces a line and space complete signal which instructs the computer that a line of characters has been recorded and the required space between the recorded line and the next succeeding line of characters to be recorded has been established. The line and space complete signal frees the computer to issue the next load annotation data command, loan, for initiating the loading of the memory unit 30 with annotation data representing the next succeeding line of characters to be recorded.

Having now described the operation of the annotation generator of the present invention with reference to FIGS. 1–5, a more complete understanding of the present invention may be had by reference to FIGS. 6–17 which illustrate in detail each of the units of FIG. 5. The control unit of FIG. 6 will not be discussed separately but will be discussed along with each of the units of FIGS. 7–17 insofar as it functions to control their operation.

Figure 7:
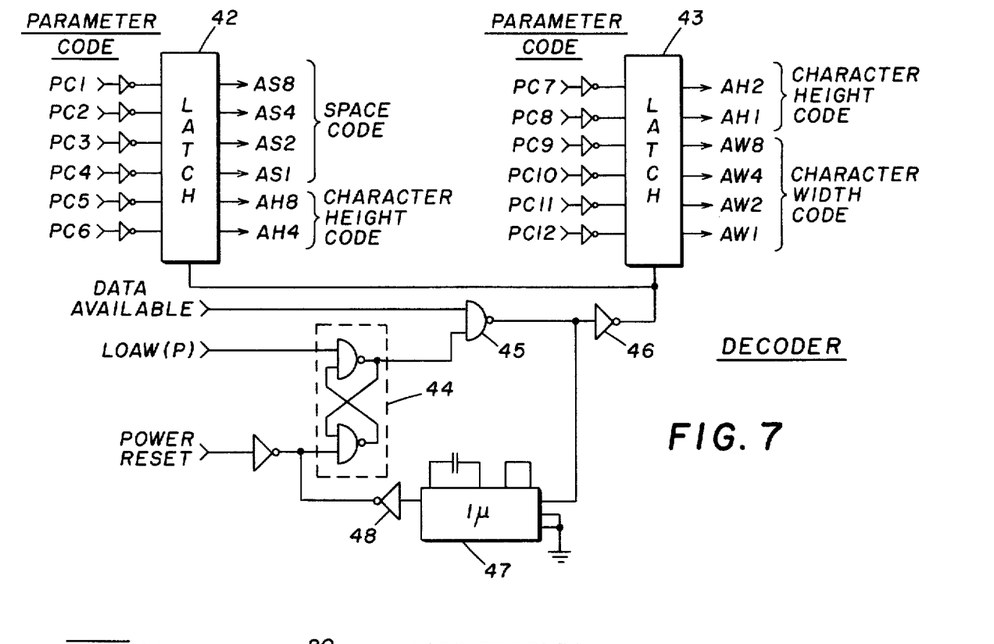

FIG. 7 illustrates the decoder 34 which provides for the character width, character height, and line space address codes AW1-AW8, AH1-AH8, and AS1-AS8, respectively. Initially, the load annotation word parameter command loaw(P) is issued by the computer. The loaw(P) command sets latch 44 to a "1" output. This arms NAND gate 45. The computer then issues the outrdy command which instructs the control unit 31 that a 12-bit parameter code (PC1-PC12) is ready to be applied to the decoder 34. The control unit applies the outrdy command by way of inverter 150 as a data available control signal to set NAND gate 45, which has previously been armed by latch 44, to a "0" output. This output is applied through inverter 46 to set the latches 42 and 43 to assume the status of the 12-bit parameter code (PC1-PC12) coupled to their inputs by way of the inverters 40 and 41. On the trailing edge of the data available control signal, NAND 45 returns to a "1" state to trigger the 1-microsecond one-shot 47 which in turn resets latch 44 through inverter 48. Additionally, there is provided the inverter 49 which resets the latch 44 each time power is initially applied to the system as will be indicated by a power reset command from the computer. The utilization of the width, height, and space codes AW1-AW8, AH1-AH8, and AS1-AS8, respectively, will be discussed in detail along with the operation of the units to which they are applied as illustrated in the block diagram of FIG. 5.

Figure 8:
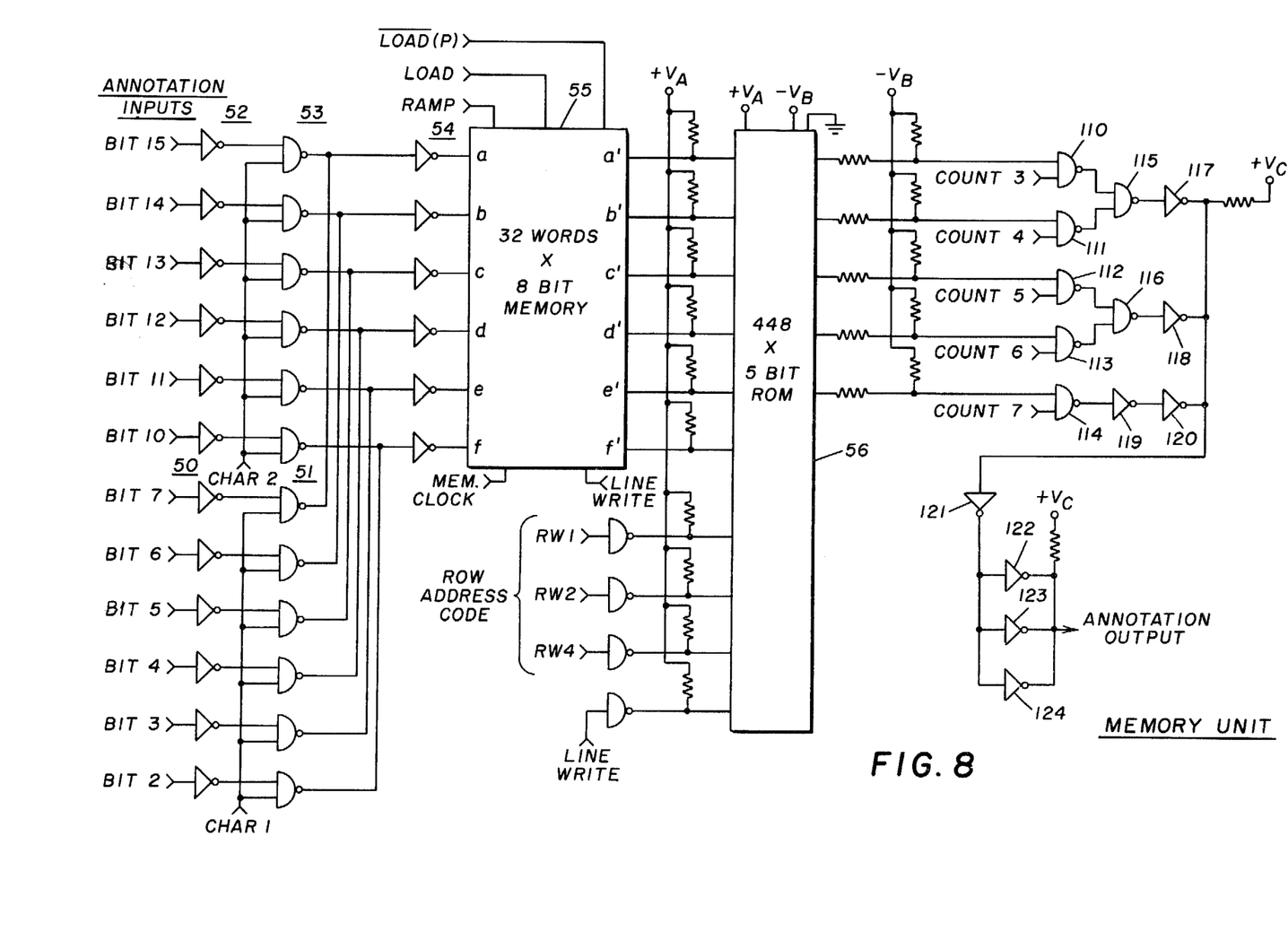

FIG. 8 illustrates the memory unit 30 which is utilized to store the two 6-bit characters represented by the annotation inputs bits 2–7 and bits 10–15. After the 12-bit parameter code has been loaded into the decoder 34, the computer issues the load annotation data command, loan. The loan command sets latch 151 of the control unit to provide a load control signal, load, which arms NAND gate 153. Latch 151 had been initially reset by the power reset signal through inverter 152. The computer then issues another outrdy command which, along with the load control signal, sets NAND gate 153 to trigger the 0.6-microsecond one-shot 155 through inverter 154. One-shot 155 provides the char 1 control signal to the plurality of NAND gates 51 for clocking the first 6-bit character (bits 2–7) through the plurality of inverters 50, NAND gates 51, and inverters 54 into the 32 words by 8-bit memory 55 by way of its a-f inputs. One-shot 155 also triggers the 0.5-microsecond one-shot 156 which in turn triggers the 0.6-microsecond one-shot 157. The one-shot 157 output is the char 2 control signal which is applied to the plurality of NAND gates 53 for clocking the second 6-bit character (bits 10–15) through the plurality of inverters 52, NAND gates 53, and inverters 54 into the memory 55 at a time delay of 1.1 microseconds after the first 6-bit character was applied to the memory 55. As previously discussed, two 6-bit characters comprise a data word. The above sequence of char 1 and char 2 control signals is then continuously repeated until a total of 16 words is stored in the memory 55. This sequence may be more fully understood by referring now to FIG. 9 which illustrates the details of the memory 55.

Figure 9:
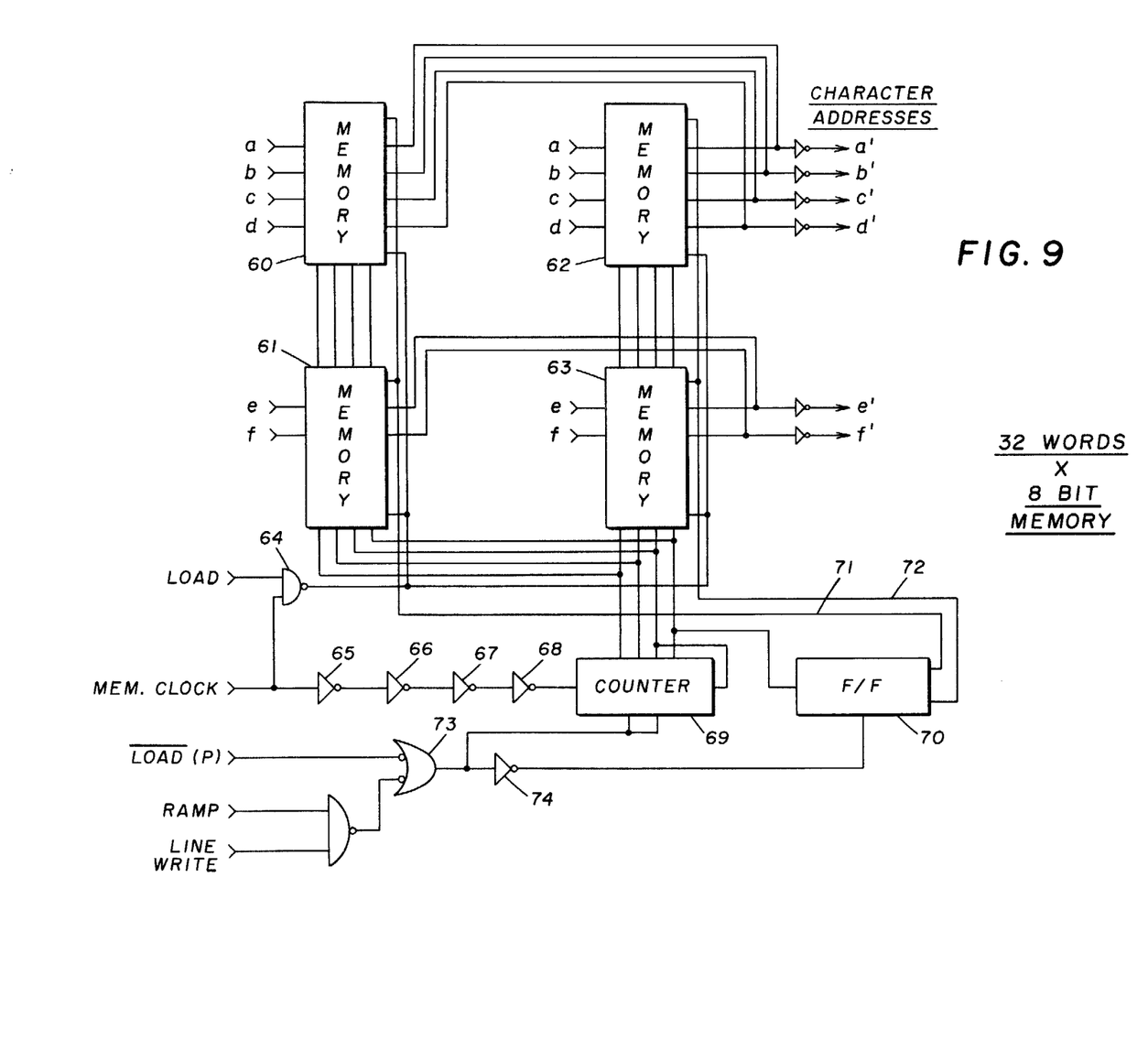

Memory unit 55 of FIG. 9 includes the memory elements 60–63. When one-shot 155 is fired, it produces the char 1 control signal which clocks the first 6-bit character in the first storage position of memory elements 60 and 61. One-shot 155 also sets NOR gate 158 on the trailing edge of its 0.6-microsecond pulse. NOR gate 158 triggers the 0.5-microsecond one-shot 159 to provide a memory clock. The memory clock and the load control signal set NAND gate 64 to increment the memory elements 60 and 61 one storage position. When char 2 control signal is provided by one-shot 157 at 1.1 microseconds after char 1 control signal, it then clocks the second 6-bit character into the second storage position of memory elements 60 and 61. One-shot 157 also sets NOR gate 158 on the trailing edge of its 0.6-microsecond pulse. NOR gate 158 again triggers one-shot 159 to provide a memory clock. This memory clock again, by way of NAND gate 64, increments the memory elements 60 and 61 to the third storage position.

When one-shot 157 is triggered, it further triggers the 0.7-microsecond one-shot 161 to provide the word enable control signal which is applied to one side of latch 160. When the char 1 control signal was produced, the other side of latch 160 was set by the one-shot 155. Then, when char 2 control signal is produced, the one-shot 160 provides its word enable control signal which causes the latch 160 to provide the data flag control signal at its output by way of NAND gate 161. The other input to NAND gate 161 is the load control signal from latch 151. The data flag control signal indicates to the computer that a word comprising two characters has now been stored in memory. The computer then repeats the foregoing-described sequence of operations for loading the next word into the memory elements 60 and 61 by again providing the next outrdy command. This sequence continues with the binary counter 69 counting each memory clock by way of inverters 65–68. Prior to the counter reaching the count of 16, the flip-flop 70 provides a "1" output on line 71 to select memory elements 60 and 61 for storage of the first 16 6-bit characters. Upon the count of 16, counter 69 sets flip-flop 70 to its other state so as to provide a "1" output on line 72. This "1" on line 72 now selects memory elements 62 and 63 for storage of the second 16 6-bit characters. In this manner, all 32 characters (or 16 words) are stored in memory.

Figure 10:
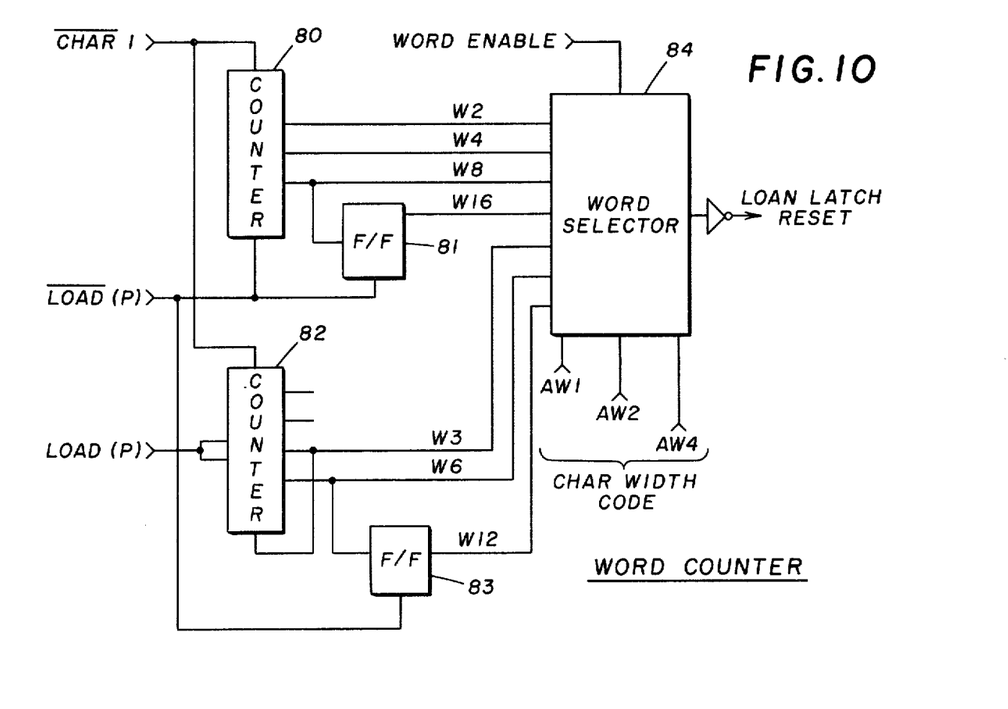

The foregoing operation of loading the memory with 16 words is terminated by a loan latch reset from the word counter 32 of FIG. 10. Referring to FIG. 10, the word counter 32 comprises the divide-by-2 counter 80 and flip-flop 81 and the divide-by-3 counter 82 and flip-flop 83. These counters and flip-flops accumulate a count of the char 1 control signals and provide for the count outputs W2, W3, W4, W6, W8, W12, and W16, indicating that 2, 3, 4, 6, 8, 12, and 16 words have been stored, respectively, in the memory 51. These count outputs are applied to word selector 84. The word selector 84 is enabled by the word enable command from the control unit 31 to provide the loan latch reset pulse when the number of words stored in memory, as indicated by count outputs W2-W16, reaches the number of words that are selected to be stored in memory by the character width address code AW1, AW2, and AW4. In this manner, 2, 3, 4, 6, 8, 12, or 16 words may be stored in memory to be written out on the face of the cathode-ray tube and reproduced on the photographic recording as a line of characters. The loan latch reset is applied through inverter 152 to reset the latch 151 in the control unit 31. When reset, the latch 151 provides the memory-loaded flag control signal on line 162 to indicate to the computer that all the characters selected for being reproduced on the photographic recording in a line of characters in accordance with the address code AW1, AW2, and AW4 have been loaded into the memory 51. Each of the word counters 80-83 of FIG. 10 and the memory clock counter 69 and flip-flop 70 of FIG. 9 will later be reset in response to the next loan command from the computer when the next succeeding line of characters is to be stored in the memory. The load control signal provided by latch 151, upon application of the loan command to its input, triggers the 0.5-microsecond one-shot 163 to provide the $\overline{\text{load}}(P)$ control signal which is applied as the reset control signal directly to word counters 80-83, and by way of NOR gate 73 and inverter 74 to counter 69 and flip-flop 70, respectively.

Having now completed the storing of a line of characters in the memory unit, the counter responds to the memory-loaded flag control signal to issue the plot annotation command, plan, which initiates the recording of these stored characters on the photographic recording. The plan command sets latch 165 in the control unit 31. Latch 165 arms the NAND gate 166 so that the next ramp signal, which is synchronized with the start of the sweep of the electron beam, sets NAND gate 166 through inverter 171. Gate 166 in turn sets the latch 167. Latch 167 sets NAND gate 173 to provide the sweep control signal to the sweep counter 37 and also fires the 20-microsecond one-shot 168. One output of one-shot 168 passes through inverter 170 to reset the row counter 39. The other output resets the sweep counter 37 and also sets latch 169. Latch 169 provides the line write control signal to the memory unit 55 to initiate the multiplexing of the stored characters to the modulation input of the cathode-ray tube and the line write control signal through inverter 172 to enable the character width selector 36 and the character height selector 38.

Figure 11:
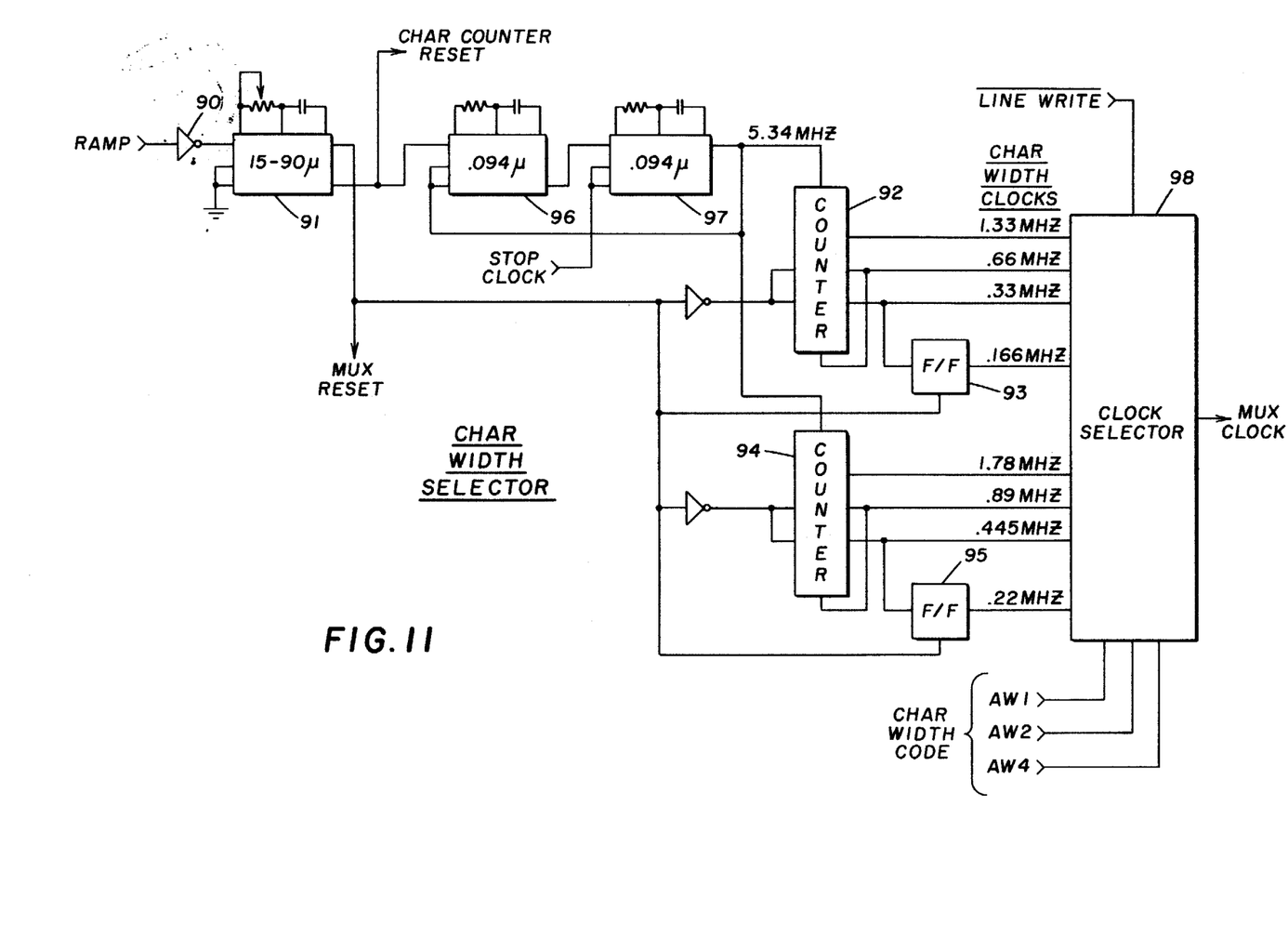

The ramp signal, in addition to being applied to the control unit 31 to provide for the above-mentioned controls, is further applied to the character width selector 36 which is illustrated in FIG. 11. Referring now to FIG. 11, the inverter 90 passes the ramp signal to trigger the 15-90-microsecond variable one-shot 91 which controls the centering of the line of characters on the face of the cathode-ray tube. At the start of each sweep of the electron beam the ramp signal is produced and the one-shot 91 fires to reset the counters 92 and 94 and the flip-flops 93 and 95. It also resets the multiplexer counter 33 and the character counter 35. On the trailing edge of the one-shot 91 output, the ring oscillator, comprising the pair of 0.094-microsecond one-shots 96 and 97, is started. The output of the ring oscillator is a 5.34-megacycle clock applied to both counters 92 and 94 which are divide-by-16 and divide-by-12 counters, respectively. The counters 92 and 94 along with flip-flops 93 and 95 combine to provide eight different character width clocks from 1.33 megacycles down to 0.22 megacycle. One of these clocks is selected by the clock selector 98 in accordance with the desired character width as represented by the width address code AW1, AW2, and AW4. The selected clock is the multiplexer clock to the multiplexer counter 33.

Figure 12:
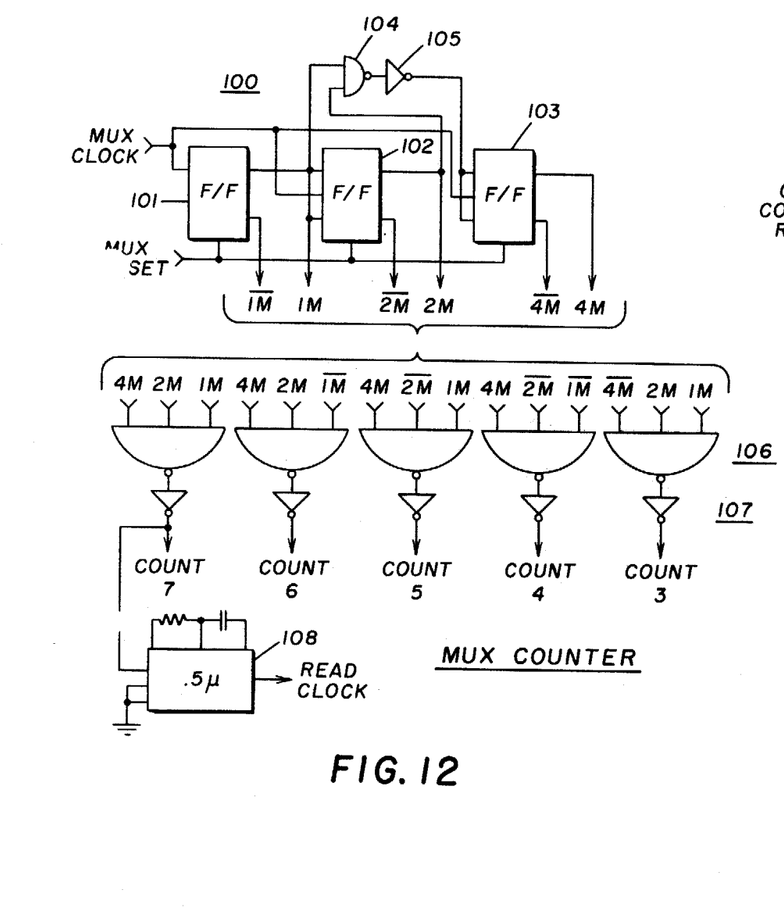

Multiplexer counter 33 is illustrated in detail in FIG. 12. Referring now to FIG. 12, each multiplexer clock pulse is counted by the counter 100, comprising the flip-flops 101-103, NAND gate 104, and inverter 105. The outputs of counter 100 ($\overline{1M}$, 1M, $\overline{2M}$, 2M, $\overline{4M}$, and 4M) are selectively combined by the plurality of NAND gates 106 and inverters 107 to provide for five count outputs, count 3 - count 7. These counts represent the third through the seventh clock pulses and are applied to the memory unit 30 to multiplex the 5 bits in a character matrix row out of the memory in the sequence previously described in conjunction with the illustration of FIG. 4. There are no count outputs for the first through the third clocks since the electron beam is to be unmodulated during these clocks so as to provide for the spacing between characters.

Referring again to FIG. 8, these counts 3-7 are applied to NAND gates 110-116 for multiplexing the 5 bits in the first matrix row of the first character in the line of characters sequentially out of the ROM memory 56 through inverters 117-124 to the annotation output line for modulation of the electron beam. These bits had previously been transferred from the ROM memory 56 by the addressing of the 6-bit code from memory element 55 in conjunction with the row address code from row counter 39 as will be more fully discussed later in conjunction with FIG. 16.

At count 7, the 0.5-microsecond one-shot 108 of the multiplexer counter provides a read clock which is applied to the NAND gate 175 in the control unit 31. So long as the line write control signal is present, NAND gate 175 is set by each read clock to fire the one-shot 159 through inverter 176, NAND gate 177, and NAND gate 158. One-shot 159 provides the memory clock to the memory unit 55 to increment its output on lines $a'$ - $f'$ to each succeeding character matrix in the line of stored characters. The read clock also is applied to the character counter 35 of FIG. 13.

Figure 13:
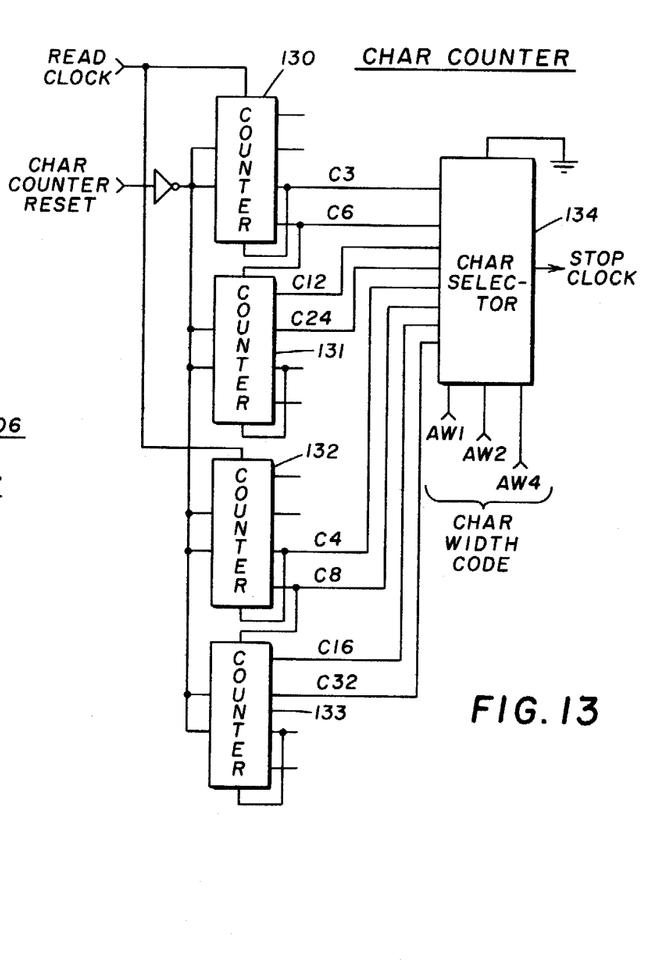

Referring now to FIG. 13, each read clock is counted and the counters 130-133 provide for a plurality of outputs (C3, C4, C6, C8, C12, C16, C24, and C32), indicating the number of characters which have been multiplexed out of the memory 30. The character selector 134 provides a stop clock when the number of characters so multiplexed is the same as that number indicated by the character width address code AW1, AW2, and AW4. The stop clock is applied to the character width selector 36 to inhibit the 5.34-megacycle ring oscillator formed by one-shots 96 and 97. This terminates the multiplexing operation and consequently the modulation of the electron beam for the remainder of its sweep across the face of the cathode-ray tube.

The next ramp signal again initiates the multiplexing of the first matrix row of the stored line of characters. This repeated multiplexing of the same matrix row is repeated until the number of sweeps is the same as that indicated by the character height address code AH1, AH2, AH4, and AH8. Each sweep control signal provided by the control unit in response to the ramp signals is counted by the sweep counter 37 illustrated in FIG. 14.

Figures 14, 15:
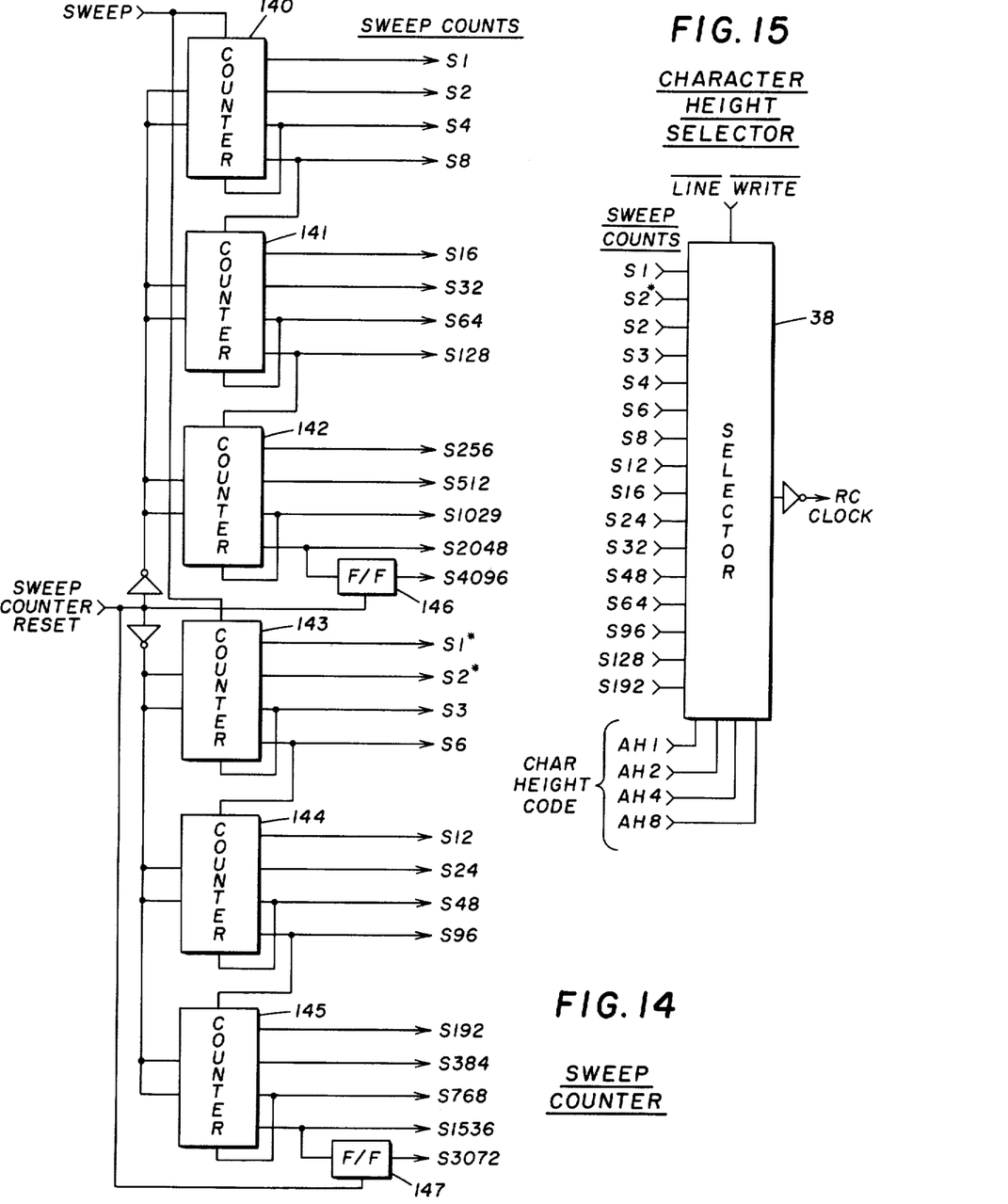

Referring now to FIG. 14, the sweep counter 37 includes the counters 140–145 and the flip-flops 146 and 147. The output of sweep counter 37 is a plurality of selected sweep counts from S1 - S4096. The sweep counts from S1 up to S192 are applied to the character height selector 38 illustrated in FIG. 15. When the number of sweeps counted reaches the number indicated by the character height address code AH1, AH2, AH4, and AH8, the character height selector 38 provides the RC clock.

Figure 16:
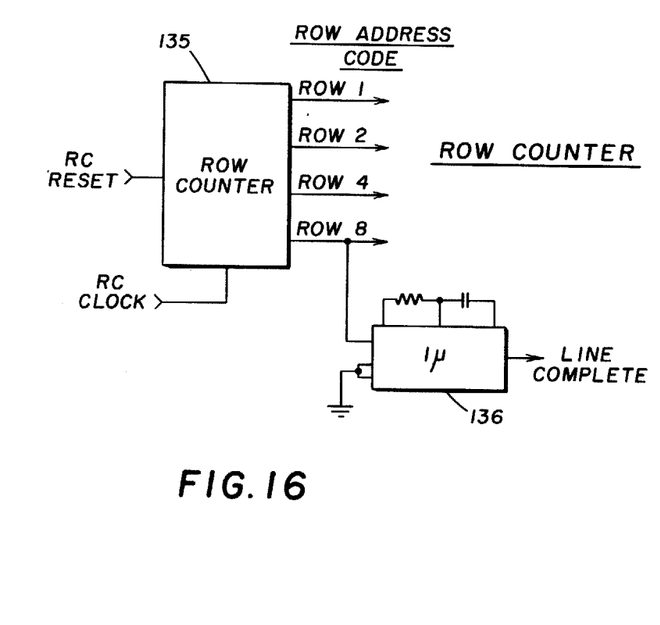
Figure 17:
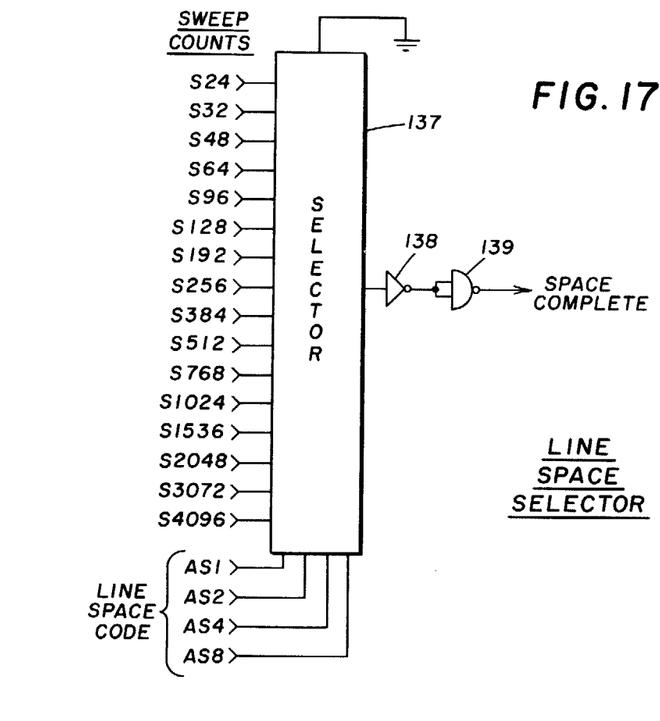

The RC clock is applied to the row counter 39 as illustrated in FIG. 16. Referring to FIG. 16, the counter 39 counts each RC clock and provides the 4-bit row address code RW1, RW2, RW4, and RW8. The RW1, RW2, and RW4 bits are applied to the ROM memory 56 through NAND gates 57–59 of FIG. 8. After the first character matrix row has been multiplexed out of memory, the RC clock pulse is provided to update the row counter by one count and provide the proper row address code to increment the ROM memory to the next row. This incrementing of rows continues until all seven rows of the 5-bit × 7-row stored character matrices have been multiplexed out of memory. Upon the next RC clock, the RW8 bit triggers the 1-microsecond one-shot 136 to provide the line complete signal which indicates to the computer that the entire line of 5-bit × 7-row characters has been multiplexed out of memory and recorded on the photographic recording. The line complete signal is also applied to control unit 31 through inverter 174 to reset the latch 169 and terminate the line write control signal to the memory unit 30 and the line write enable control signal to the character width selector 36 and the character height selector 38. Consequently, there is no further modulation of the electron beam and the subsequent sweeps of the electron beam provide for the spacing between the line of characters just recorded and the next succeeding line of characters to be recorded. The control of such spacing is by means of the line space selector 40 which is illustrated in FIG. 17. Referring to FIG. 17, selected sweep count outputs from S24 through S4096 of the sweep counter 37 are applied to the selector 137 which is addressed by the line space address code AS1, AS2, AS4, and AS8. When the number of sweeps counted reaches the number of sweeps selected by the line space address code, the selector 137 provides the space complete signal through the inverter 138 and NAND gate 139. The space complete signal resets latch 165 in the control unit 31 to provide the line and space complete control signal to the computer. The line and space complete control signal frees the computer to issue the next loan command for loading the memory unit 30 with annotation data representing the next succeeding line of characters to be reproduced on the photographic recording.

Having now described the annotation generator of the present invention in conjunction with the circuitry illustrated in FIGS. 6–17, it is to be understood that such circuitry is merely representative of one embodiment. In accordance with such embodiment, the following sets forth specific types of circuit components.

| Reference Designation | Description |
| --- | --- |
| $V_A$ | +14 VDC |
| $V_B$ | −14 VDC |
| $V_C$ | +5 VDC |
| All inverters | MC 836P Motorola |
| All one-shot multivibrators | MC 74121 Motorola |
| All flip-flops | MC853P Motorola |
| NAND/NOR gates 106 and 158 | MC 862P Motorola |
| All other NAND/NOR gates | MC 846P Motorola |
| Data selectors 84, 98, and 134 | SN74151 Texas Instruments |
| Data selectors 38 and 137 | SN74150 Texas Instruments |
| Memory units 60 through 63 | SN7489 Texas Instruments |
| ROM memory 56 | TMS-2403 JC Texas Instruments |
| Binary counters 82, 94, 130, and 143 | SN7492 Texas Instruments |
| Binary counters 69, 92, 131, 140–142, 144, and 145 | SN7493 Texas Instruments |
| Binary counters 80, 132, 133, and 135 | MC839P Motorola |
| Latches 42 and 43 | SN74174 Texas Instruments |
| All other latches | MC846P Motorola |

I claim:

1. In a seismic data processing system for photographically reproducing seismic data from a plurality of seismic channels in which the electron beam of a cathode-ray tube is intensity modulated one time during each sweep across the face of the cathode-ray tube for each of said seismic channels and a drum recorder which rotates past the face of the cathode-ray tube to photographically record each such sweep of the electron beam, thereby producing a photographic recording of the seismic traces in parallel relationship, the method of annotating the recording with alpha-numeric characters, comprising the steps of:

a. storing a plurality of alpha-numeric characters in the form of digital bit character matrices, such characters to be reproduced in a line across the photographic recording, b. synchronizing a plurality of clock pulses with each sweep of the electron beam across the face of the cathode-ray tube, c. modulating the electron beam at the frequency of said clock pulses with the bit information from the first row of each of the stored character matrices to thereby display the first row of each character matrix sequentially across the face of the cathode-ray tube, the electron beam being unmodulated for a predetermined number of clock pulses between the first row of each character matrix to provide for the horizontal character spacing on the recording, d. producing a photographic recording in side-by-side relationship of each sweep of the electron beam whereby the width of each character recorded on the photographic recording is proportional to the frequency of said clock pulses, and e. repeating steps (c) and (d) for each succeeding row of the character matrices, the recording of the line of characters being complete when the electron beam has been modulated by the bit information contained in the last row of the character matrices.

2. The method of claim 1 including the modulation of the electron beam for a predetermined number of sweeps for each matrix row of bit information whereby the height of the character reproduced on the photographic recording is proportional to said predetermined number of sweeps.

3. The method of claim 1 further including the step of repeating steps (a) through (e) to reproduce another line of characters on the photographic recording following a predetermined number of sweeps of the electron beam after the completion of the reproduction of the preceding line of characters, the electron beam being unmodulated for said predetermined number of sweeps provides for the spacing between the lines of characters on the recording.

4. In a seismic data processing system for photographically reproducing seismic data from a plurality of seismic channels including a converter for providing a plurality of pulse width modulation signals representing the data contained on each seismic channel, a multiplexer for successively applying one modulation signal for each of said plurality of seismic channels to a cathode-ray tube to successively intensity modulate the electron beam one time during each sweep of the electron beam across the face of said cathode-ray tube for each of said seismic channels, and a drum plotter for photographically reproducing in a side-by-side relationship each sweep of said electron beam whereby a plurality of seismic traces are recorded simultaneously in parallel, the combination therewith of:
 a. a memory for storing a line of alpha-numeric characters in binary bit matrices, said characters to be photographically reproduced on said drum plotter to annotate said seismic traces,
 b. a generator of a plurality of different frequency clock pulses,
 c. means responsive to a selected one of said clock pulses for multiplexing the bit information out of said memory sequentially along common rows of each of said matrices, the sweep of the electron beam of the cathode-ray tube being modulated by the multiplexed output of the memory to display on the face of the cathode-ray tube that portion of each character in the line of characters represented by said multiplexed output, and the width of each character portion in the line of characters being determined by the frequency of the selected clock pulses,
 d. a sweep counter which counts each sweep of the electron beam,
 e. means for incrementing said memory after a first predetermined number of sweeps of the electron beam have been counted by said sweep counter whereby bit information from each succeeding common row of said character matrices is multiplexed out of said memory to modulate the electron beam, and
 f. means for inhibiting the production of said clock pulses for a second predetermined number of sweeps of said electron beam after the first predetermined number of sweeps have been completed for the last common row of said character matrices in the line of characters, thereby providing for a spacing which is parallel to and immediately following the line of characters.

5. The system of claim 4 wherein said means for multiplexing the bit information from said memory includes a counter which counts said clock pulses and inhibits the multiplexing of said bits of information from said memory for a predetermined number of said clock pulses immediately after the last bit of each character matrix in a common row has been multiplexed to the modulation input of said cathode-ray tube, thereby providing for the horizontal spacing between each character in the line of characters.

* * * * *